US011601191B2

(12) United States Patent
Gokhale et al.

(10) Patent No.: US 11,601,191 B2
(45) Date of Patent: Mar. 7, 2023

(54) INFORMATION RATE AND QUALITY-OF-SERVICE CONFIGURATIONS FOR END-TO-END DATA FLOW IN AN NGSO SATELLITE NETWORK

(71) Applicant: Lockheed Martin Corporation, Bethesda, MD (US)

(72) Inventors: Dilip Shyamsundar Gokhale, Germantown, MD (US); Anshul Deepak Kantawala, Frederick, MD (US); Piya Seth Bhaskar, North Potomac, MD (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 2 days.

(21) Appl. No.: 16/781,978

(22) Filed: Feb. 4, 2020

(65) Prior Publication Data
US 2020/0259558 A1    Aug. 13, 2020

Related U.S. Application Data

(60) Provisional application No. 62/802,639, filed on Feb. 7, 2019.

(51) Int. Cl.
*H04B 7/185*      (2006.01)
*H04L 12/801*     (2013.01)
(Continued)

(52) U.S. Cl.
CPC ......... *H04B 7/18513* (2013.01); *H04L 47/34* (2013.01); *H04W 28/0268* (2013.01); *H04W 28/10* (2013.01)

(58) Field of Classification Search
CPC .............. H04B 7/18513; H04L 47/34; H04W 28/0268; H04W 28/10
See application file for complete search history.

(56) References Cited

U.S. PATENT DOCUMENTS 6,493,342 B1 *  12/2002  Breslow ............. H04B 7/18584
                                                  370/394
7,257,371 B1 *   8/2007  Bettinger ........... H04B 7/18513
                                                  455/430
(Continued)

FOREIGN PATENT DOCUMENTS

EP    1701574    9/2006
EP    3175647    6/2017

OTHER PUBLICATIONS

Partial Supplementary European Search Report from European Patent Application No. 20753153.4, dated Oct. 7, 2022, 23 pages.

*Primary Examiner* — Huy D Vu
*Assistant Examiner* — Bailor C Hsu
(74) *Attorney, Agent, or Firm* — BakerHostetler

(57) ABSTRACT

A communication system consists of a satellite constellation including a number of NGSO satellites, one or more gateways and a control center. The satellites facilitate communication for multiple user terminals. Each gateway communicates with the satellites and user terminals and provides connectivity to the terrestrial networks, and the control center controls operation of the satellites, the gateways and the user terminals. The satellites, the user terminals, the gateways and the control center include hardware that may be software-defined network (SDN) enabled to ensure efficient admission control, precision handover management and quality-of-service (QoS) enforcement algorithms.

16 Claims, 8 Drawing Sheets

(51) Int. Cl.
*H04W 28/10* (2009.01)
*H04W 28/02* (2009.01)
*H04L 47/34* (2022.01)

(56) References Cited

U.S. PATENT DOCUMENTS

| | | | |
|---|---|---|---|
| 7,359,344 B1* | 4/2008 | Cheng | H04B 7/18589 370/321 |
| 2003/0050008 A1* | 3/2003 | Patterson | H04B 7/18578 455/12.1 |
| 2006/0068798 A1* | 3/2006 | Reddi | H04B 7/18519 455/446 |
| 2008/0220771 A1* | 9/2008 | Agarwal | H04B 7/18584 455/428 |
| 2010/0061260 A1* | 3/2010 | Bugenhagen | H04L 43/00 370/252 |
| 2010/0182947 A1* | 7/2010 | Jong | H04B 7/18543 370/316 |
| 2010/0315949 A1* | 12/2010 | Agarwal | H04B 7/22 370/235 |
| 2011/0026528 A1 | 2/2011 | Breslow et al. | |
| 2012/0191824 A1* | 7/2012 | Davis | H04L 41/083 709/220 |
| 2015/0282003 A1* | 10/2015 | Noerpel | H04L 5/0058 370/236 |
| 2016/0037434 A1* | 2/2016 | Gopal | H04L 45/02 370/316 |
| 2016/0072613 A1* | 3/2016 | Esserman | H04W 28/04 370/230 |
| 2016/0142327 A1 | 5/2016 | Johnson et al. | |
| 2016/0183126 A1* | 6/2016 | Roy | H04B 7/2046 370/322 |
| 2016/0204853 A1* | 7/2016 | Anders | H04B 7/195 370/316 |
| 2017/0041248 A1* | 2/2017 | Toy | H04Q 11/0067 |
| 2018/0084476 A1* | 3/2018 | Kay | H04B 7/195 |
| 2018/0242345 A1* | 8/2018 | Johnson | H04W 84/06 |
| 2020/0112362 A1* | 4/2020 | Roy | H04B 7/18528 |

* cited by examiner

INFORMATION RATE AND QUALITY-OF-SERVICE CONFIGURATIONS FOR END-TO-END DATA FLOW IN AN NGSO SATELLITE NETWORK

CROSS-REFERENCES TO RELATED APPLICATIONS

This application claims benefit of U.S. Provisional Application No. 62/802,639, filed on Feb. 7, 2019, which is incorporated herein by reference in its entirety.

STATEMENT REGARDING FEDERALLY SPONSORED RESEARCH OR DEVELOPMENT

Not Applicable.

FIELD OF THE INVENTION

The present invention generally relates to satellite communication and, more particularly, to information rate and quality-of-service (QoS) guarantees for end-to-end data flows in a non-geosynchronous orbit (NGSO) satellite network.

BACKGROUND

A non-geosynchronous orbit (NGSO) satellite networks have the potential to provide very high throughput, low-delay services to end-users, allowing them to effectively complement or even compete with terrestrial fiber and the wireless service offerings. However providing these high throughput services is extremely challenging given the dynamic nature of an NGSO constellation wherein the user-terminal-to-gateway (non-processed satellite constellation), user-terminal-to-satellite, gateway-to-satellite, and satellite-to-satellite connectivity is continually changing given the nonstationary aspects of the satellites in relation to the earth. Link connectivity changes also occur due to events such as user terminal mobility, user terminal experiencing blockages and network node hardware failures.

The dynamic connectivity presents unique challenges for ensuring conformance to information rate and QoS guarantees required by end-users. In the case of NGSO networks, with satellites that utilize on-board switching, another challenge is the processing constraint that limits the QoS solutions that can be implemented.

SUMMARY

According to various aspects of the subject technology, methods and systems are disclosed for ensuring information rate and quality-of-service (QoS) guarantees for end-to-end data flows in a non-geosynchronous orbit (NGSO) satellite network.

In one or more aspects, a communication system consists of a satellite constellation including a number of satellites, one or more gateways, one or more user terminals, and a control center. The satellites facilitate communication between user terminals and the gateway which typically provides connectivity to terrestrial wide area networks or between multiple user terminals. Each gateway communicates with the satellites, and the control center controls operation of the satellites, the gateways and the user terminals. The satellites, the user terminals, the gateways and the control center include hardware that ensures precision handover management and allow for efficient control and configuration of QoS enforcement algorithms. The hardware can optionally be software-defined network (SDN) enabled In other aspects, a satellite gateway includes a transceiver circuit and digital processing hardware that can be SDN enabled. The transceiver circuit communicates with one or more satellites of an NGSO satellite constellation, one or more user terminals. The digital processing hardware ensures precision handover management of packets of a user-traffic flow to and/or from user terminals and satellites, and performs policing and shaping of the user traffic flow. Policing includes analyzing network ingress traffic to separate packets with rates within a committed information rate (CIR) from packets having rates within an excess information rate (EIR) and to discard packets with rates exceeding the EIR. The gateway provides connectivity to terrestrial wide area networks.

In yet other aspects, a user terminal includes a transceiver circuit and digital processing hardware that can be SDN enabled. The transceiver circuit communicates with one or more satellites of an NGSO satellite constellation, one or more gateways, and one or more user terminals. The digital processing hardware ensures precision handover management of packets of a user-traffic flow to and/or from gateways, other user terminals and satellites, and performs policing and shaping of the user traffic flow. Policing includes analyzing network ingress traffic to separate packets with rates within a CIR from packets having rates within an EIR and to discard packets with rates exceeding the EIR.

In yet other aspects, a satellite in a processed NGSO constellation includes a transceiver circuit and digital processing hardware that can be SDN enabled. The transceiver circuit communicates with one or more satellites of an NGSO satellite constellation, one or more gateways, and one or more user terminals. The digital processing hardware provides for switching of packets between interfaces to user terminals, gateways and neighboring satellites connected via crosslinks. The packet switching is controlled by forwarding tables that are typically configured via a control center as well as local routing algorithms. The digital hardware also implements prioritized forwarding of traffic to ensure that packets that conform to CIR are accorded higher priority.

In yet other aspects, a control center includes a transceiver circuit and a processor. The transceiver circuit communicates via a nearby gateway with one or more satellites of an NGSO satellite constellation, one or more gateways and multiple user terminals. The processor controls operations of the satellites, the gateways and user terminals, and secures a required end-to-end network capacity to support a CIR by evaluating all time-variant network paths.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

Figure 1:
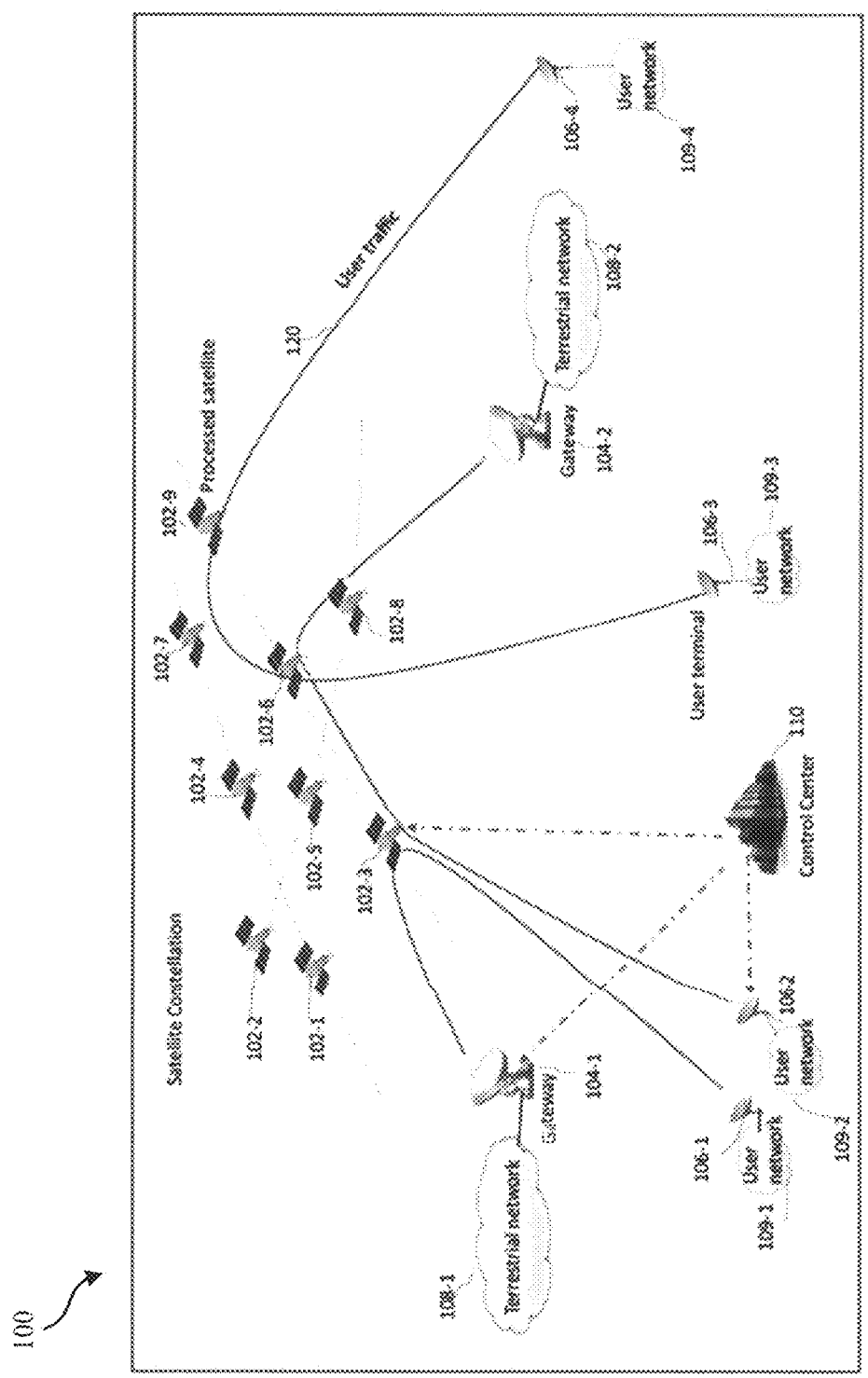
FIG. 1 is a high-level diagram illustrating an example non-geosynchronous orbit satellite network environment, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description, which includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

In some aspects of the present technology, methods and configuration are disclosed to address the challenge of meeting information-rate and quality-of-service (QoS) guarantees for end-to-end data flows in a non-geosynchronous orbit (NGSO) satellite network. Committed information rate (CIR) is an example of an information-rate commitment by the service provider. Similarly, examples of QoS guarantees include end-to-end packet latency (delay), and target packet error-rate guarantees. The dynamic connectivity of NGSO satellite networks presents unique challenges for ensuring conformance to information-rate and QoS guarantees required by end-users. Connectivity changes also occur due to events such as user terminal mobility, user terminal experiencing blockages and network node hardware failures. Additionally, for the case of NGSO networks with satellites that utilize onboard switching, its main challenge is the processing constraint, which limits the QoS solutions that can be implemented.

The solution presented by the subject technology includes a combination of algorithms and procedures that work collectively to ensure that information-rate and QoS guarantees are met within an NGSO satellite network. Example components of the solution include a 24×7 flow-admission control, an edge-based NGSO satellite-network QoS enforcement coupled with priority forwarding at satellites, precision time-based forwarding updates, specific link layer enhancements, flow-based resequencing, and software-defined network (SDN)-based QoS flow tables at user terminals, gateways and satellites.

The solutions presented by the subject technology are implemented via dedicated hardware including one or more dedicated processors of a user terminal (UT), a gateway or a space-vehicle (SV) (e.g., a satellite such as an NGSO satellite). In one or more implementations, the subject solutions may be partially implemented by a general processor of a UT, a gateway or an SV.

The 24×7 flow-admission control guarantees that the required end-to-end capacity in the network to support the information-rate commitment is feasible by evaluating all time-variant network paths (referred to as 24×7 availability). The edge-based NGSO satellite-network QoS enforcement coupled with priority forwarding at satellites ensures that packet-loss, delay and delay-variance guarantees are satisfied. It further ensures that user traffic that exceeds the committed information rate does not cause network congestion. The precision time-based forwarding updates ensures that packet losses due to satellite handoffs are minimized and the loss rate is within the class-of-service (CoS)-specific guidelines for each traffic flow. The link-layer enhancements are needed to further ensure that packet losses are minimized during link connectivity changes. The flow-based re-sequencing ensures that packet ordering is preserved (especially needed when edge and intermediate node handovers are encountered). Finally, the SDN-based QoS flow tables allow for efficient control and configuration of QoS enforcement algorithms at both the network edges and satellite nodes.

FIG. 1 is a high-level diagram illustrating an example NGSO satellite-network environment 100 that consists of on-board processing satellites according to certain aspects of the disclosure. The example NGSO satellite network environment 100 includes a number of NGSO satellites 102 (hereinafter, "satellites 102," e.g., 102-1, 102-2 . . . 102-9), a number of satellite gateways 104 (hereinafter "gateways 104", e.g., 104-1 and 104-2), multiple UTs 106 (e.g., 106-1, 106-2 . . . 106-4) and a network operation center 110 (hereinafter, "control center 110"). The satellites 102 are members of an NGSO satellite constellation and facilitate communication between the gateways 104 and the UTs 106 as well as between the UTs 106. The communication between the UTs 106 can take place through one or more satellites 102. For example, the UT 106-1 can connect to the gateway 104-13 via the satellite 102-3. The UT 106-2, for instance, can connect to gateway 104-2 via satellites 102-3, and 102-6. The UT 106-3 can connect to UT 106-4 via the satellites 102-6 and 102-9. The gateways 104 are connected to terrestrial networks 108 (e.g., 108-1 and 108-2, such as the Internet). Note that user networks connected to UTs 106 can also be the local Internet or Intranet 109. The control center 110 can control the operations of the satellites 102, gateways 104 and UTs 106. In one or more aspects, the control center 110 may include a transceiver circuit to communicate with the satellites 102, gateways 104, UTs 106 via a "nearby" gateway 104 and a processor. The processor can secure a required end-to-end network capacity to support a CIR by evaluating all time-variant network paths and can enable the UTs 106 and the gateways 104 to perform per-flow QoS enforcement based on the CoS of a respective admitted traffic flow (e.g., 120) to secure a required end-to-end network capacity to support a CIR (e.g., 1 Gbps) by evaluating all time-variant network paths that will be encountered given the dynamic nature of the NGSO constellation.

In some aspects, the satellites 102, the gateways 104, the UTs 106 and the control center 110 include hardware that are SDN that are enabled to ensure precision handover management and to allow efficient (e.g., with minimum overhead) control and configuration of QoS enforcement algorithms, which are implemented in a field-programmable gate array (FPGA), Application Specific Integrated Circuit (ASIC) or firmware to enforce data rates based on the user's service-level agreement. Ensuring precision handover management includes making sure that packet losses due to satellite handoffs are minimized to values within CoS guidelines of a respective admitted traffic flow, and ensuring precision handover management further includes time-synchronized updates to forwarding tables at network nodes of the communication system (e.g., NGSO satellite-network environment 100) and linklayer enhancements, as discussed in more detail herein.

Due to the nonstationary aspects of the NGSO satellites in relation to the earth, the UT-to-gateway (e.g., the UT 106-1 to the gateway 104-1, can either be direct in the case of a non-processed satellite, UT-to-satellite (e.g., the UT 106-1 to satellite 102-3 in the case of a processed satellite), gateway-to-satellite (e.g., the gateway 104-1 to satellite 102-3) and satellite-to-satellite (e.g., the satellite 102-1 to satellite 102-4) connectivity is continually changing. The nonstationary aspects of the NGSO satellites make providing high throughput, low-delay services to end-users and allowing the NGSO satellite network to effectively complement or even compete with the terrestrial fiber and the wireless service offerings challenges. These challenges are overcome by the system of the subject technology, as discussed in more detail herein.

Figure 2:
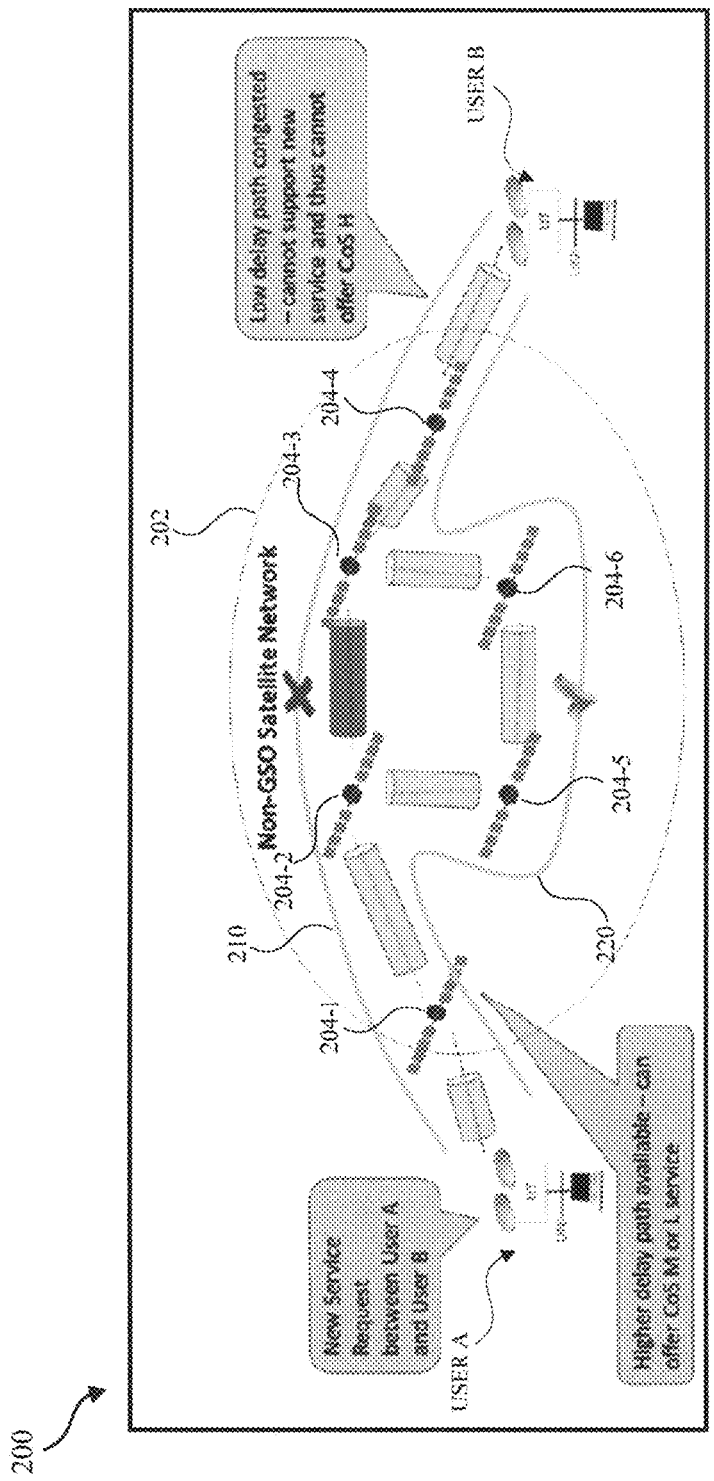
FIG. 2 is a schematic diagram illustrating an example scenario which depicts the implementation of a user-traffic call admission-control algorithm, according to certain aspects of the disclosure.

FIG. 2 is a schematic diagram illustrating an example system 200 for depicting a user-traffic admission-control approach, according to certain aspects of the disclosure. The example system 200 includes a user A, a user B and a number of satellites 204 (e.g., NGSO satellites 204-1, 204-2 ... 204-6) of an NGSO satellite network 202. The satellites of the example system 200 are used to establish a communication between user A and user B, implementing a capacity-based admission-control user-traffic flow-control algorithm and is also referred to as a 24×7 flow admission control algorithm because it ensures that the CIR associated with the flow can be guaranteed on an end-to-end basis on a time-variant network topology.

For a new user traffic flow between user A and user B being admitted to the system 200, a central entity such as a network operation center (e.g., control center 110 of FIG. 1) verifies network capacity availability based on currently admitted connections using a CoS-based admission control algorithm. The algorithm supports multiple paths (e.g., a path 210 and a path 220) between end points (e.g., user A and user B) consistent with different CoS attributes. For a required CoS level, the algorithm verifies that a valid end-to-end path with adequate capacity is available for the user traffic flow using precomputed time-based forwarding tables. The above confirmation is done for all time-variant paths that will be encountered (referred to as 24×7 availability). The user flow is admitted with the requested CoS level that can be supported based on the above computation. If the requested CoS level is not acceptable, the new user flow is rejected and a list of alternative CoS levels that can be supported is provided. The admission control approach is applicable for NGSO networks that include no onboard processing or with onboard processing. In the case of the NGSO networks that do not use onboard processing, the admission control evaluates different UT-to-gateway paths (where the UT may connect to a different gateway ("roaming") while retaining a relationship with a home gateway that supports the network access point toward the terrestrial network). In the case of NGSO networks that employ on-board processing, the admission control also evaluates intersatellite paths that are traversed. For example, if a low-delay path 210 is congested (due to a capacity limitations on the link between satellites 204-2 and 204-3) and cannot support the new service request and thus cannot offer a high-level CoS (CoS H), an alternative path 220, which passes through satellites 204-1, 204-2, 204-5, 204-6, 204-3 and 204-4, with more delay, and which can only offer a medium-level CoS (CoS M), is used to provide a link between user A and user B.

Figure 3:
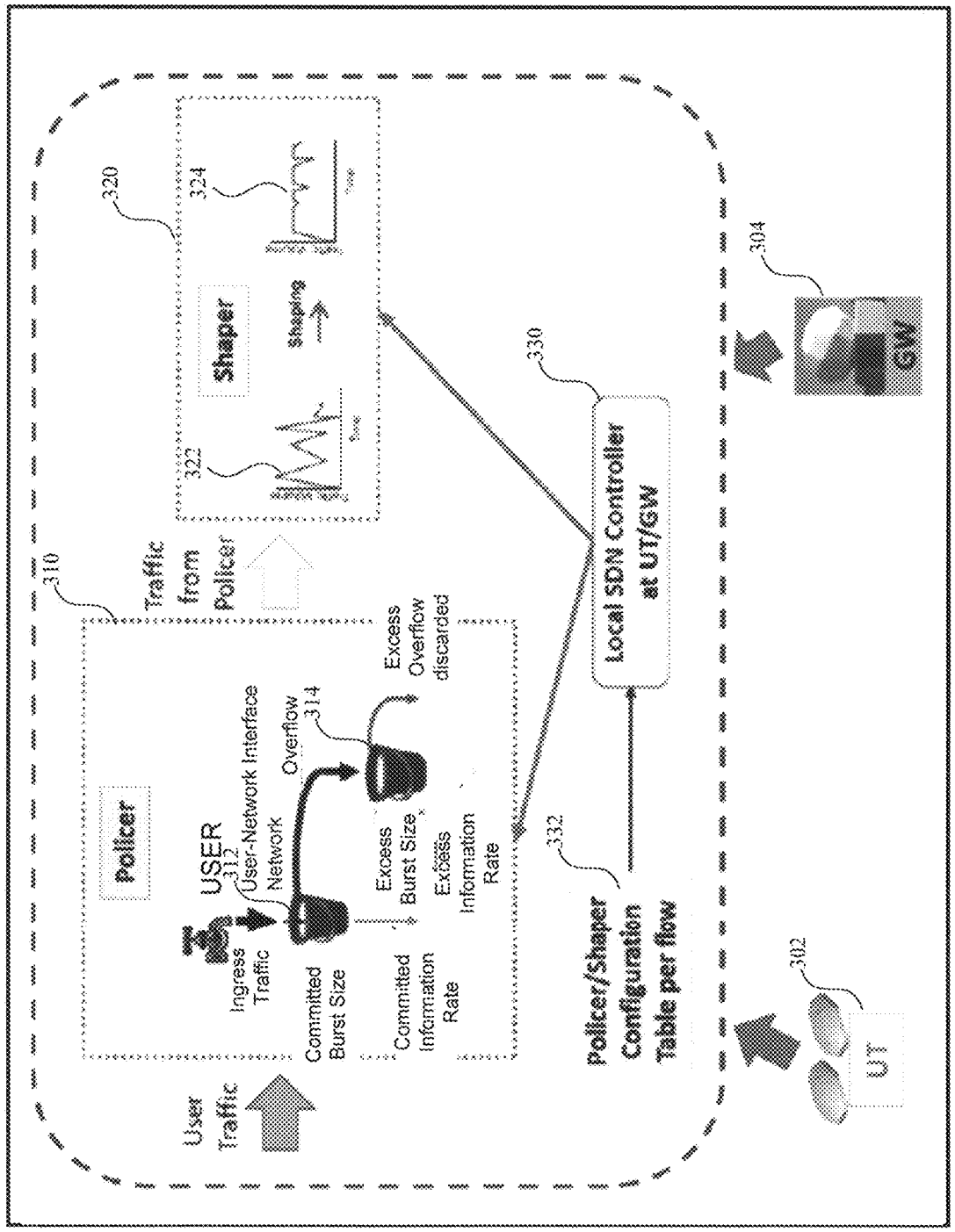
FIG. 3 is a block diagram illustrating examples of a policer block and a shaper block for policing and shaping user traffic at a network edge, according to certain aspects of the disclosure.

FIG. 3 is a block diagram illustrating examples of a policer block 310 and a shaper block 320 for policing and shaping user traffic at a network edge device, according to certain aspects of the disclosure. Examples of the network edge device include ground systems such as UTs and gateways, for example, a UT 302 and a gateway 304. The policer 310, the shaper 320, and a local controller 330 that can be SDN based, are implemented in hardware such as FPGA or firmware, within the UT 302 and the gateway 304.

The core satellite network QoS enforcement is performed by using the policer block 310 and the shaper block 320, which perform per-flow policing and shaping of all ingress and egress traffic in concert with a color-based priority queueing in the satellite core (in the case of NGSO satellite networks with satellites that feature onboard processing and cross-links). For each user traffic flow, all network edge devices such as the UT 302 and a gateway 304 are configured with a two-rate, three-color policer and shaper to enforce the CoS parameters. The policer block 310 marks all conformant traffic green and nonconformant traffic yellow. Conformant traffic is traffic that is less than or equal to the CIR, and non-conformant traffic has a rate that is less than or equal to the peak information rate (PIR) (referred to as excess information rate (EIR)). All traffic with rates above the PIR is dropped by the policer block 310. The shaper block 320 smooths out bursty traffic to enable the satellite network core to maximize the statistical multiplexing of multiple user streams. Shaped traffic is also necessary for the capacity-based admission-control algorithm to produce accurate results. The local SDN controller 330 uses policer/shaper flow configuration tables, discussed below.

Figure 4:
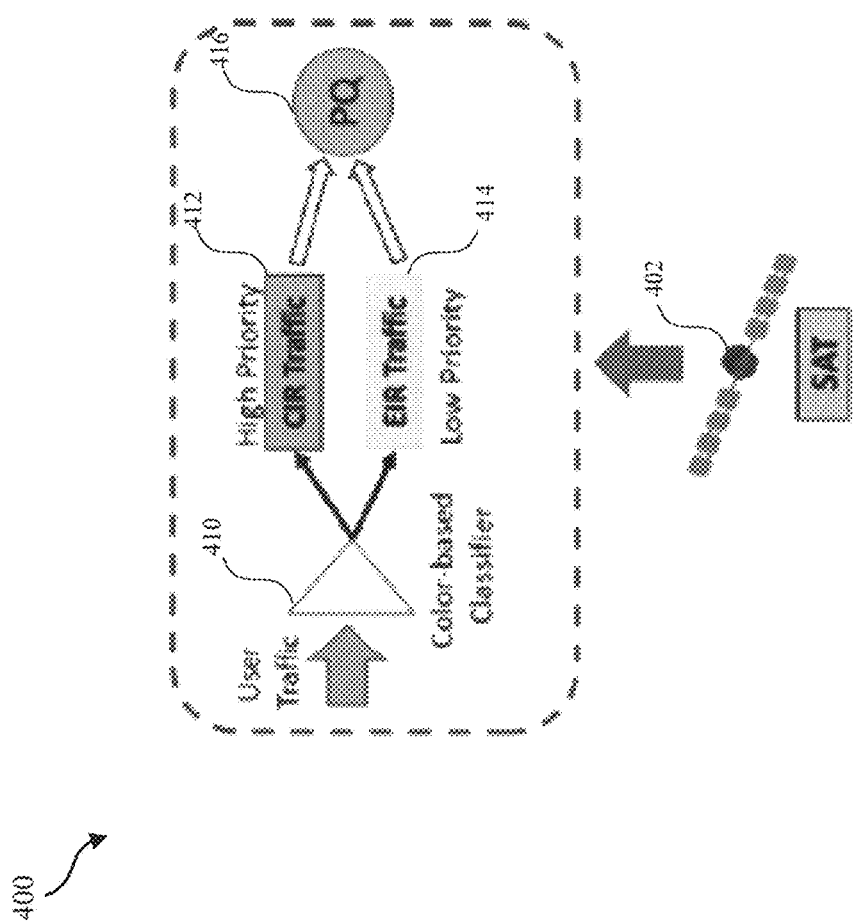
FIG. 4 is a functional block diagram illustrating an example of a quality-of-service (QoS) treatment of user traffic on a satellite node, according to certain aspects of the disclosure.

FIG. 4 is a functional block diagram illustrating an example of a QoS treatment 400 of a user traffic flow on a satellite node, according to certain aspects of the disclosure. Each satellite (core network node), such as satellite 402, will use a color-based classifier 410 to identify and mark CIR and EIR traffics, respectively, as high priority (green) and low priority (yellow). The output of the color-based classifier 410 is passed to the priority queue (PQ) 416 for color-based queueing and forwarding of the user traffic. In this simple two-color PQ, packets that are marked green (conformant) are forwarded at a higher priority compared to packets that are marked yellow (nonconformant). Although the priority queueing is performed on the aggregate user traffic at each satellite node and not on individual user traffic flows, it ensures that all conformant traffic will not face any congestion in the core network. Thus, the satellite nodes can provide hard QoS guarantees without complex per-flow queueing and policing algorithms, allowing for very low on-board resource usage.

Figure 5:
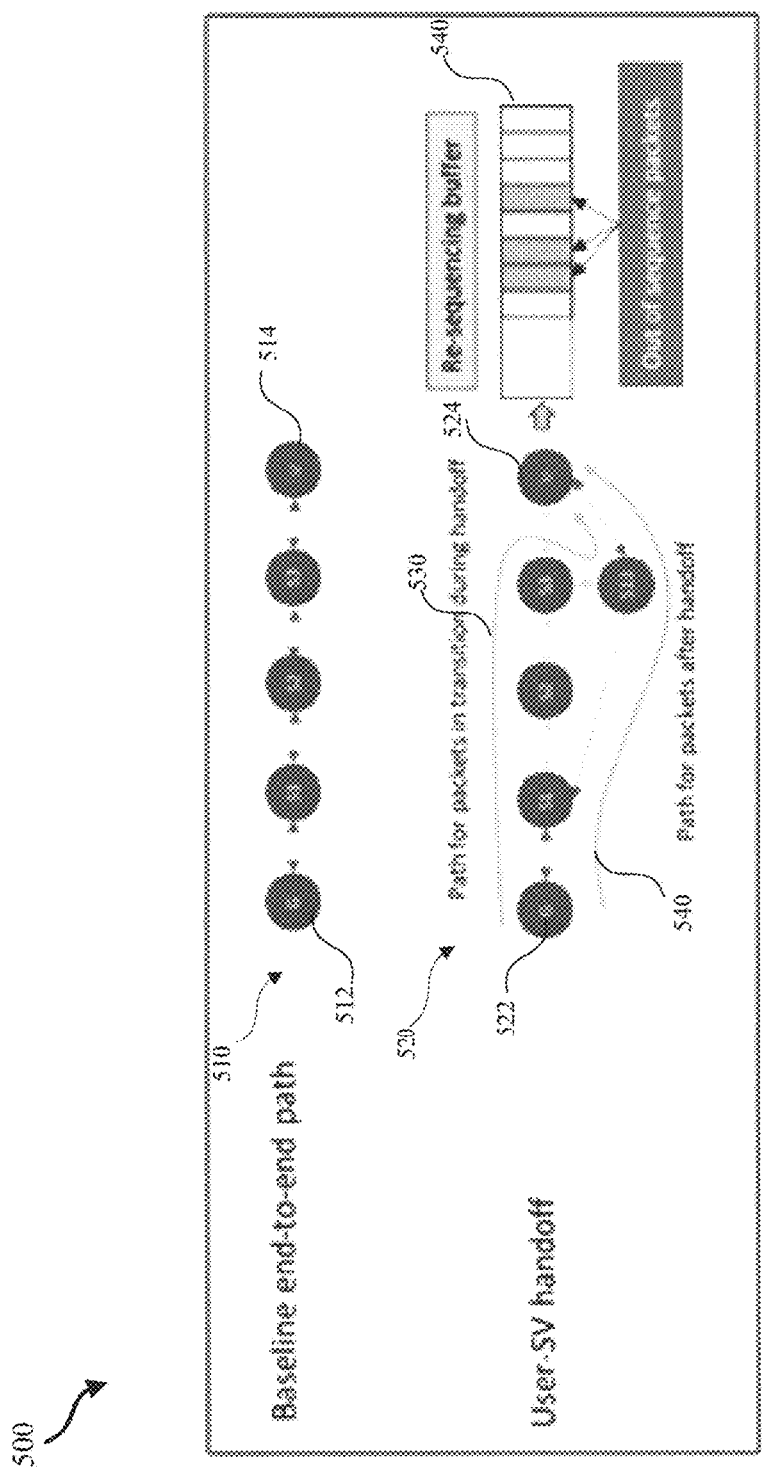
FIG. 5 is a flow diagram illustrating an example method of resequencing of packets at a terminal edge-node, according to certain aspects of the disclosure.

FIG. 5 is a flow diagram illustrating an example method 500 of resequencing of packets at a terminal edge-node, according to certain aspects of the disclosure. Packets resequenced in this example method 500 may arrive out of sequence due to a longer route for packets in transition due to handover. Shown in FIG. 5 is a baseline end-to-end path 510 between a gateway 512 and a UT 514 via a number of NGSO satellites S1, S2 and S3. Also depicted is a user-space vehicle (SV) handoff scenario 520. In the user-SV handoff scenario 520, two paths for packets between a gateway 522 and a UT 524 are shown. A path 530 is a path for packets prior to handoff and passes through satellites S1, S2, S3, and the path 540 is for packets after handoff and passes through satellites S1 and S13. Due to delay difference in paths 530 and 540 (longer route for packets in transition), the packets may arrive out of sequence due to the handover. The out-of-sequence packets in the buffer 540 are re-sequenced to correct their order. The examples shown in FIG. 5 consider an NGSO satellite network that uses on-board processing. The same approach can be equally used for non-processed NGSO satellite networks where the radio-frequency (RF) connectivity between a UT and a gateway can change (without a change in the user terminal to the home gateway that provides the network access point connectivity).

Figure 6:
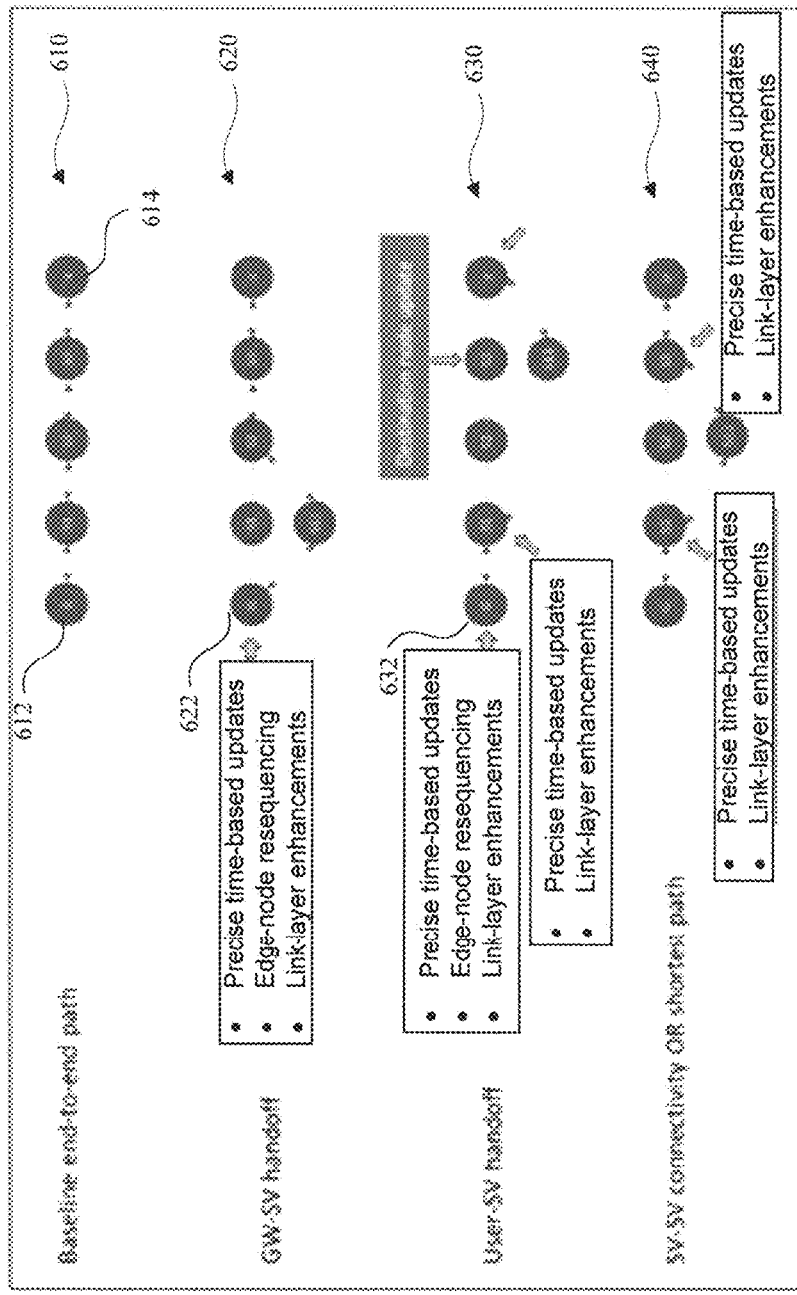
FIG. 6 is a schematic diagram illustrating example handover scenarios for different handoff cases, according to certain aspects of the disclosure.

FIG. 6 is a schematic diagram illustrating example handover scenarios 620, 630 and 640 for different handoff cases, according to certain aspects of the disclosure. A baseline end-to-end path 610, shown in FIG. 6, includes a gateway 612 and a UT 614 linked via a number of NGSO satellites S1, S2, S3 and S4. The scenario 620 is a gateway-satellite (GW-space vehicle (SV)) handoff. The scenario 630 is a UT-satellite (User-SV) handoff, and the scenario 640 is a satellite-satellite (SV-SV) connectivity. The scenario 640 is a change in the SV-SV connectivity change in time, where connectivity between satellites S1 and S3 is first provided by satellite S2 and then by satellite S12.

The precision handover management of the subject technology uses a set of algorithms to minimize packet loss during handovers. The algorithms include using a time-synchronous network, precision time-based forwarding update algorithms and link-layer forwarding enhancement algorithms. The precision time-based update algorithms consist of: a) updating forwarding tables at all network elements on the new and old paths, b) duplication of packets at the source edge-node for a short period of time, and c) when user terminal IDs are not part of the forwarding schema and when user terminal handoffs occur across satellites, updating the destination ID for user terminals at the source edge-nodes and at the satellite that loses connectivity to the user terminal, and d) disabling of link layer segmentation prior to a link connectivity change. The link layer enhancement algorithms consist of: a) re-forwarding of enqueued packets that could not be transmitted at the link layer, and b) when user terminal IDs are not part of the forwarding schema and when user terminal handoffs occur across satellites, short-term buffering of packets, destined for user terminal, at the handoff destination satellite.

The time-synchronized update algorithms at network nodes (UTs, GWs and SVs) require time synchronization to a common time reference such as the global positioning system (GPS). This allows for precise switching of all nodes during handoffs.

The precise time-based forwarding table update algorithm includes the steps of a) utilizing deterministic link connectivity change in the network to compute at the network control center, precise handoff times and distributing them to all network nodes, b) switching from losing to gaining SV handoff path at precise precomputed times, based on handoff timing, c) individually coordinating forwarding table change timing for different elements in the satellite system depending upon the path delay of the network element from the source. To perform the last step (c); i) the UT performs handover at time $T_o$, ii) the losing SV stops forwarding packets to the UT at $T_o-\delta$, where $\delta$ is the time delay between the SV and the user UT, and iii) the gateway switches the route to the gaining SV at $T_o-\delta^*$, where $\delta^*$ is the time delay between the gateway and the UT through the gaining SV.

The duplication of packets at the source edge-node for a short period of time algorithm includes the source edge-node duplicating packets towards the old and new destination IDs for a short period of time during the user terminal handoff process as configured by the control center.

When user terminal IDs are not part of the forwarding schema and when user terminal handoffs occur across satellites, the destination ID update algorithm includes the steps of a) for an inter-SV handoff, providing the losing SV with a new destination SV node ID for the UT and b) forwarding packets arriving at SV for the UT to the new destination SV for a short period after the handover has been completed.

The link layer enhancements algorithm includes the steps of a) performing packet forwarding at the network layer based on a flow table (discussed below), b) maintaining no additional queueing at the link layer so that any packet can immediately be switched to a different interface as necessary during a handover event, c) if link layer queueing is necessary, after the handover event, moving all packets destined for the UT that are remaining in the original interface link layer queue to the new interface link layer queue by looking up the new forwarding table entry to the node, d) during a handover event (for a short duration prior to the handover), disabling the link layer segmentation of packets, e) temporarily allocating additional downlink capacity allocated to the UT on the gaining SV during a handover event to maintain minimal queuing for packets destined to the UT, and f) temporarily buffering packets on the gaining SV for packets destined to the UT during the handover event.

The edge-node resequencing algorithm includes the steps of a) maintaining by each edge-node in the system (UT and GW) a packet buffer to perform egress traffic resequencing during handoff, as illustrated in FIG. 6, and b) individually configuring buffer sizes for each service class.

In the scenario 620, the appropriate precise time-based update and link layer enhancement algorithms and the edge-node resequencing algorithm, described above, are implemented at the gateway 622 for the gateway-satellite (GW-SV) handoff. In the scenario 630, the precise time-based update and link layer enhancement algorithms and the edge-node resequencing algorithm are implemented by the gateway 632, the appropriate precise time-based update and link layer enhancement algorithms are executed by the satellite S1 and the destination node update is implemented by a satellite S3 for the user-satellite (UT-SV) handoff. Finally, in the scenario 640, the appropriate precise time-based update and link layer enhancement algorithms are implemented by satellites S1 and S3.

Figures 7, 8:
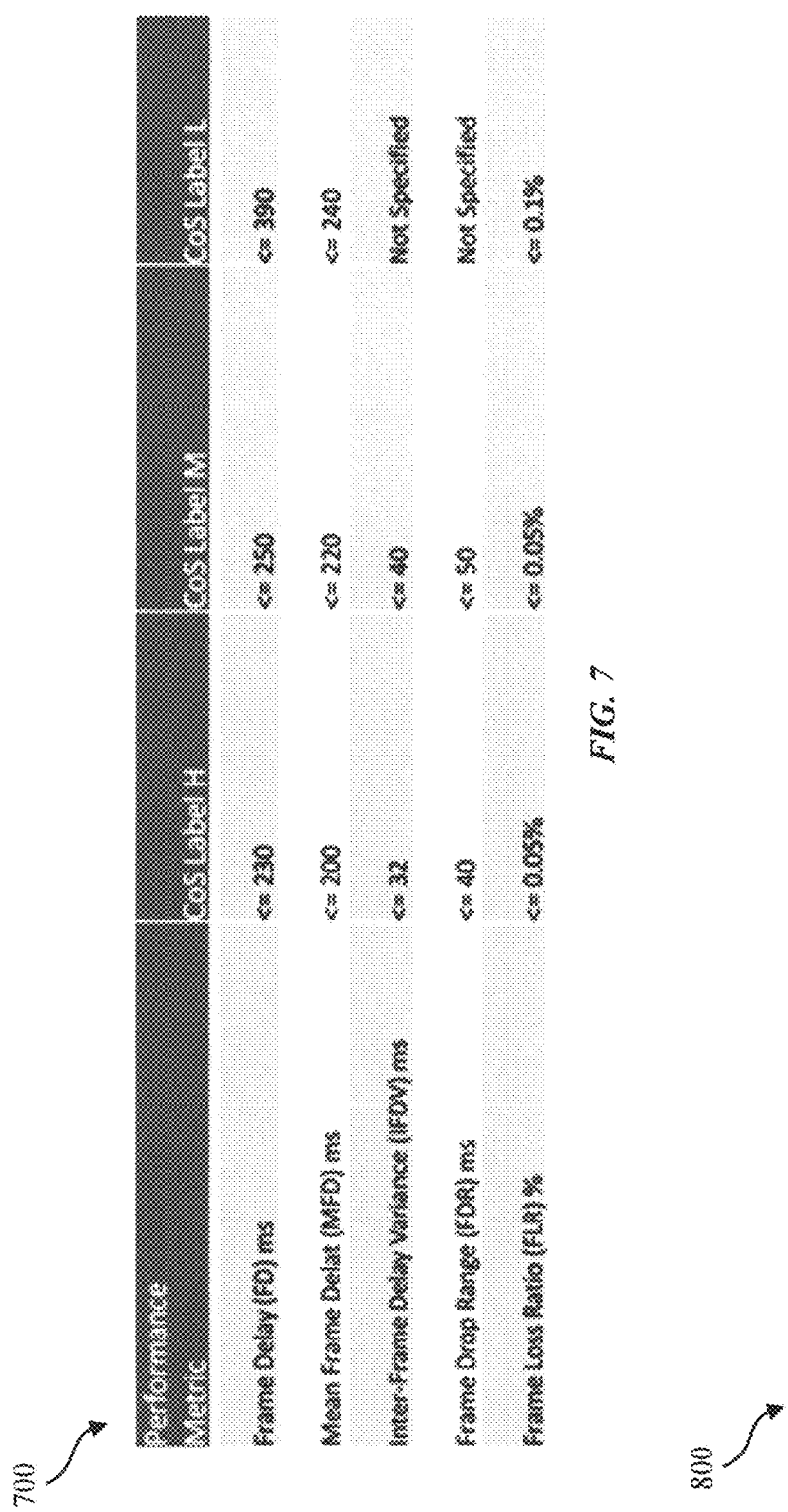
FIG. 7 is a table illustrating example performance metric values for various class-of-service labels.
FIG. 8 is a table illustrating example software-defined networking n-tuple

FIG. 7 is a table 700 illustrating example performance metric values for various CoS labels. The CoS labels described in table 700 are CoS label H, CoS label M and CoS label L, where H, M and L stand for high, medium and low, respectively. In the table 700, for each CoS label, performance metrics including frame delay (FD), mean frame delay (MFD) and frame-drop range (FDR) are specified in milliseconds (ms). Also specified for each CoS label is the frame-loss ratio (FLR), which is stated in a percentage.

FIG. 8 is a table 800 illustrating an example SDN n-tuple. The table 800 is an example SDN-based QoS flow table that allows for efficient control and configuration of QoS enforcement algorithms at both the network edges and satellite nodes. The SDN flow table 800 can also be used by the layer-2 processing update algorithm to perform packet forwarding at the data link layer. The configuration of the SDN table 800 is sent from a centralized source (ground network controller element, e.g., 110 of FIG. 1) to all the other elements in the system (e.g., UTs, satellites and gateways). The first set of fields (columns) in the SDN table 800 is used to match incoming packets. The Action column is used to direct the type of action to be taken for the matching packets. The specific columns (fields) used for matching are selectable, but will typically not include IP and TCP headers in an NGSO constellation network FIG. 9 conceptually illustrates an electronic system with which some aspects of the subject technology can be implemented. The electronic system 900, for example, can be a UT (e.g., UT 106 of FIG. 1), a gateway (e.g., 104 of FIG. 1), a server, a switch, a router, a receiver or any device that can control and/or perform processing of data including aggregation of data, or generally any electronic device that transmits signals over a network. The electronic system 900 may also be embedded in the NGSO satellites 102 of FIG. 1 and the control center 110 of FIG. 1. Such an electronic system includes various types of computer-readable media and interfaces for various other types of computer-readable media. Electronic system 900 includes bus 908, Processor(s) 912, system memory 904, read-only memory (ROM) 910, permanent storage device 902, input device interface 914, output device interface 906, and network interface 916, or subsets and variations thereof.

Bus 908 collectively represents all system, peripheral, and chipset buses that communicatively connect the numerous internal devices of electronic system 900. In one or more implementations, bus 908 communicatively connects Processor(s) 912 with ROM 910, system memory 904, and permanent storage device 902. From these various memory units, Processor(s) 912 retrieve(s) instructions to execute and data to process in order to execute the processes of the subject disclosure. The Processor(s) 912 can be a single processor or a multicore processor in different implementations.

ROM 910 stores static data and instructions that are needed by Processor(s) 912 and other modules of the electronic system. Permanent storage device 902, on the other hand, is a read-and-write memory device. This device is a nonvolatile memory unit that stores instructions and data even when electronic system 900 is off. One or more implementations of the subject disclosure use a mass-storage device (such as a magnetic or optical disk and its corresponding disk drive) as permanent storage device 902.

Other implementations use a removable storage device (such as a floppy disk or flash drive, and its corresponding disk drive) as permanent storage device 902. Like permanent storage device 902, system memory 904 is a read-and-write memory device. However, unlike storage device 902, system memory 904 is a volatile read-and-write memory, such as random access memory (RAM). System memory 904 stores any of the instructions and data that Processor(s) 912 need(s) at runtime. In one or more implementations, the processes of the subject disclosure, for example, the trained ROM, are stored in system memory 904, permanent storage device 902, and/or ROM 910. From these various memory units, Processor(s) 912 retrieve(s) instructions to execute and data to process in order to execute the processes of one or more implementations. In one or more implementations, the Processor(s) 912 execute(s) the automatic processes of the subject technology, including executing various algorithms described above with respect to FIG. 2 and FIG. 6.

Bus 908 also connects to input device interface 914 and output device interface 906. Input device interface 914 enables a user to communicate information and select commands to the electronic system. Input devices used with input device interface 914 include, for example, alphanumeric keyboards and pointing devices (also called "cursor-control devices"). Output device interface 906 enables, for example, the display of images generated by electronic system 900. Output devices used with output device interface 906 include, for example, printers and display devices such as a liquid crystal display (LCD), a light-emitting diode (LED) display, an organic LED (OLED) display, a flexible display, a flat-panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Figure 9:
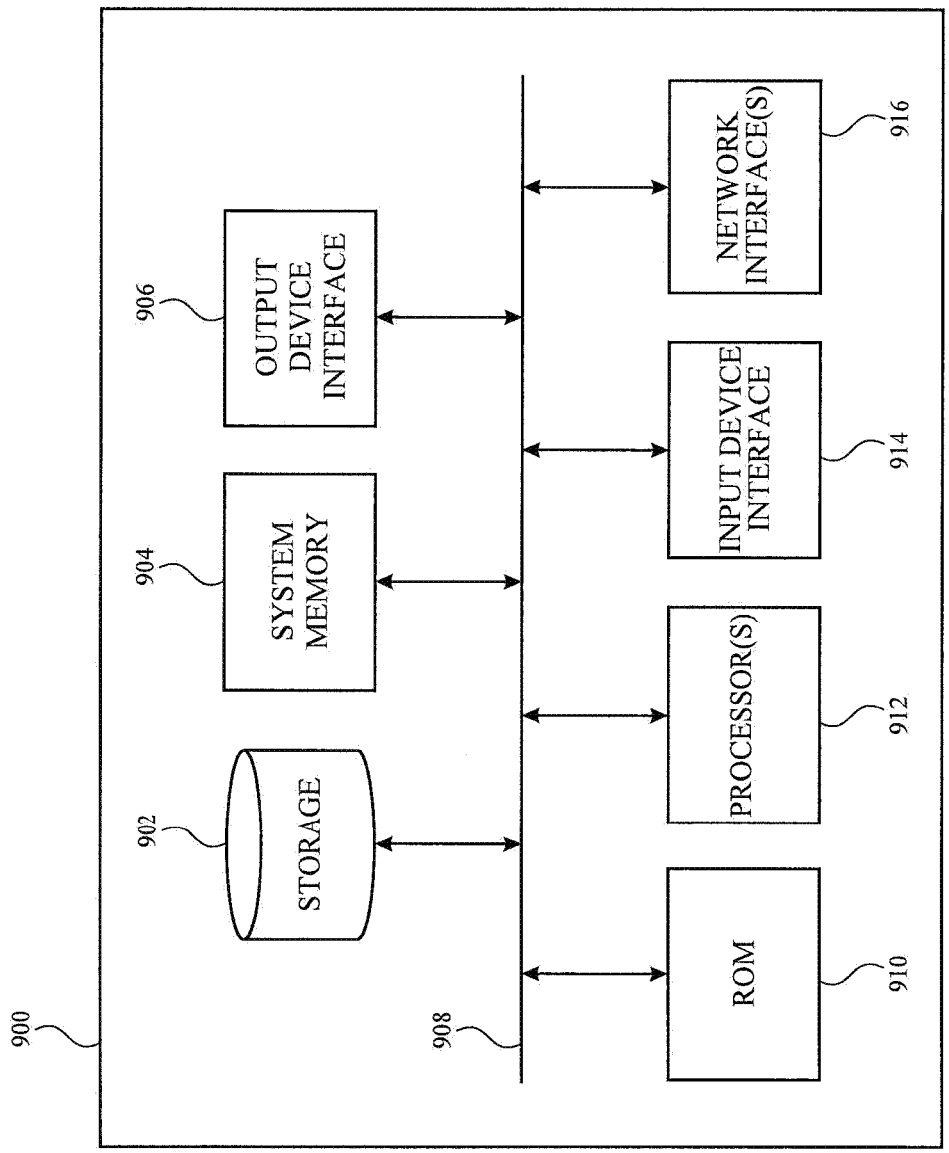
FIG. 9 conceptually illustrates an electronic system with which some aspects of the subject technology can be implemented.

Finally, as shown in FIG. 9, bus 908 also couples electronic system 900 to a network (not shown) through network interfaces 916. In this manner, the computer can be a part of a network of computers (such as a local-area network (LAN), a wide-area network (WAN), or an Intranet, or a network of networks, such as the Internet). Any or all components of electronic system 900 can be used in conjunction with the subject disclosure.

In some aspects, the subject technology may be used in various markets, including, for example, and without limitation, the signal-processing and communications markets.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified, and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A communication system comprising:
a non-geosynchronous orbit (NGSO) satellite constellation including a plurality of satellites configured to facilitate communication between edge-nodes including at least some of a plurality of user terminals and one or more gateways; and
a control center configured to control operation of the plurality of satellites and the edge-nodes,
wherein,
at least some of the satellites of the plurality of satellites are configured to perform on-board processing,
at least some of the satellites of the plurality of satellites comprise nonprocessed satellites,
the plurality of satellites are configured to use cross-links for inter-satellite connectivity, and
the plurality of satellites, the edge-nodes and the control center include hardware that guarantees end-to-end committed information rate (CIR) and quality of service (QoS) for admitted flows,
wherein the control center is further configured to verify a valid end-to-end path with adequate capacity for a requested class of service is available by evaluating all time-variant network paths that are encountered due to dynamic attributes of the NGSO satellite constellation and location changes due to mobility of one or more of the plurality of user terminals and provide an alternative class of service that can be supported when the valid end-to-end path for a requested class of service cannot be verified.

2. The communication system of claim 1, wherein the edge-nodes are configured to perform edge-based QoS enforcement along with priority forwarding to satellites by using at least one of hardware or firmware, wherein the at least one of hardware or firmware is configured to:
analyze network ingress traffic to separate and mark packets with rates within the CIR from packets having rates within an excess information rate (EIR), and
discard packets with rates exceeding the EIR.

3. The communication system of claim 1, wherein packet losses due to link connectivity changes, caused by deterministic satellite orbits, user terminal mobility, link blockages and failures are minimized by updating packet forwarding tables at network nodes on new and old paths, taking into consideration path delay of impacted network nodes from a destination edge-node.

4. The communication system of claim 1, wherein packet losses due to link connectivity changes, caused by deterministic satellite orbits, user terminal mobility, link blockages and failures, are minimized by duplication of packets at a source edge-node for a short period of time during a line-connectivity change transition.

5. The communication system of claim 1, wherein packet losses due to link connectivity changes caused by deterministic satellite orbits, user terminal mobility, link blockages and failures, are minimized by updating a destination ID for the plurality of user terminals at source edge-nodes and at one or satellites of the plurality of satellites that provides connectivity to a user terminal of the plurality of user terminals prior to a handoff, when user terminal IDs are not part of a network forwarding schema.

6. The communication system of claim 1, wherein packet losses due to link connectivity changes caused by deterministic satellite orbits, user terminal mobility, link blockages and failures are minimized by disabling of a link layer segmentation prior to a link connectivity change.

7. The communication system of claim 1, wherein packet losses due to link connectivity changes caused by deterministic satellite orbits, user terminal mobility, link blockages and failures are minimized by link layer forwarding enhancements that reforward enqueued packets that could not be transmitted at a link layer.

8. The communication system of claim 1, wherein packet losses due to link connectivity changes caused by deterministic satellite orbits, user terminal mobility, link blockages and failures are minimized by link layer forwarding enhancements that provide short-term buffering of packets destined for a user terminal of the plurality of user terminals at a handoff destination satellite of the plurality of satellites, when user terminal IDs are not part of a forwarding schema and when user terminal handoffs occur across satellites.

9. The communication system of claim 1, wherein the edge-nodes are configured to insert sequence numbers into packets, wherein the sequence numbers are used to perform egress resequencing to reorder the packets that are received out of sequence.

10. The communication system of claim 1, wherein the plurality of satellites and the edge-nodes are configured to use software-defined networking (SDN) to allow for an efficient control and configuration by allowing communication of control and configuration information with a reduced overhead.

11. The communication system of claim 1, wherein the hardware that guarantees an end-to-end CIR and QoS are configured to execute data rate and QoS enforcement algorithms based on a user's service level agreement, and wherein the hardware includes at least one of an application-specific integrated circuit (ASIC), a field-programmable gate array (FPGA) or firmware.

12. An edge-node comprising:
a transceiver configured to communicate with one or more satellites of a non-geosynchronous orbit (NGSO) satellite constellation and one or more user terminals; and
hardware configured by a controller, for minimizing packet losses, to perform:
updating a forwarding table on a first path used during a handover event and on a second path subsequent to the handover event;
updating a destination ID for a user terminal of the one or more user terminals and at a satellite, of the one or more satellites, that loses connectivity to the user terminal;
duplicating packets for the first path and the second path; and
during the handover event, disabling of link-layer segmentation for a duration prior to a link-connectivity change.

13. The edge-node of claim 12, wherein the hardware is further configured to perform the destination ID update by:
providing the satellite that loses the connectivity with a new destination space vehicle node ID; and
after the handover event, forwarding the packets, using the new destination space vehicle node ID, from the satellite that loses the connectivity.

14. A satellite comprising:
a transceiver configured to communicate with i) one or more satellites of a non-geosynchronous orbit (NGSO) satellite constellation and one or more user terminals; and
hardware configured by a controller, for minimizing packet losses, to perform:
updating a forwarding table on a first path used during a handover event and on a second path subsequent to the handover event;
duplicating packets at a source edge-node;
updating a destination ID for a user terminal of the one or more user terminals at the source edge-node and at a satellite, of the one or more satellites, that loses connectivity to the user terminal;
disabling of a link-layer for a duration prior to a link-connectivity change; and
re-forwarding the packets that are not be transmitted at the link layer.

15. The satellite of claim 14, wherein the hardware is further configured to during the handover event, temporarily buffering the packets on a second satellite, of the one or more satellites, wherein the second satellite is configured to transmit the packets to the user terminal.

16. A control center comprising:
a link configured to communicate with one or more satellites of a non-geosynchronous orbit (NGSO) satellite constellation, one or more gateways and a plurality of user terminals; and
a processor configured to:
control operation of the one or more satellites, the one or more gateways and the plurality of user terminals; and
guarantee end-to-end committed information rate (CIR) and quality of service (QoS) for admitted flows,
wherein the processor is further configured to verify a valid end-to-end path with adequate capacity for a requested class of service is available by evaluating all time-variant network paths that are encountered due to dynamic attributes of the NGSO satellite constellation and location changes due to mobility of one or more of the plurality of user terminals and provide an alternative class of service that can be supported when the valid end-to-end path for a requested class of service cannot be verified.

* * * * *